UNITED STATES PATENT OFFICE.

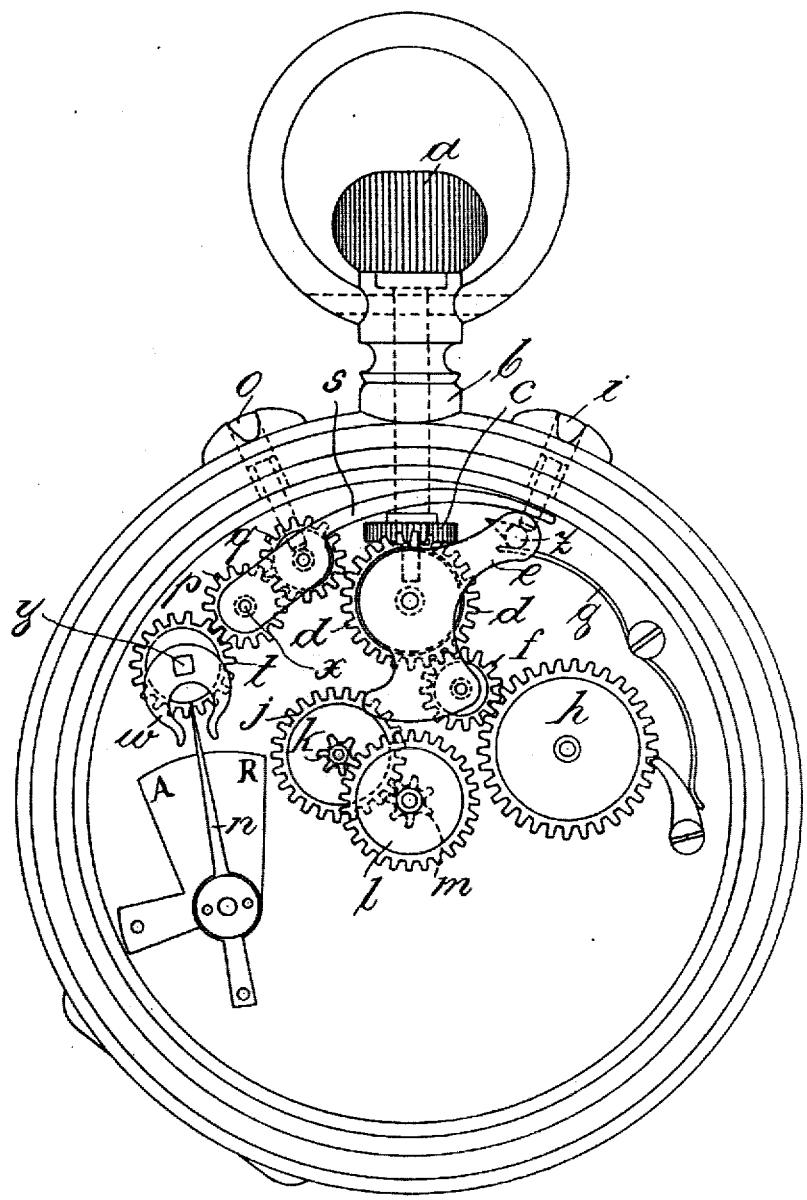

ADOLF FEILCKE, OF CHARLOTTENBURG, GERMANY.

WATCH.

No. 809,290. Specification of Letters Patent. Patented Jan. 9, 1906.

Application filed June 8, 1904. Serial No. 211,616.

*To all whom it may concern:*

Be it known that I, ADOLF FEILCKE, a subject of the Grand Duke of Mecklenburg-Schwerin, and a resident of 10 Herderstrasse, Charlottenburg, near Berlin, Kingdom of Prussia, German Empire, have invented certain new and useful Improvements in Watches, of which the following is an exact specification.

My invention relates to improvements in watches, and more especially to a device for easily regulating the watches without opening the watchcase and recognizing the degree of regulation.

In order to make my invention more clear, I refer to the accompanying drawing, which shows a back view of a watch provided with my new invention, the cover being partly broken away in order to show the construction of the device.

In the drawing, $a$ is the winding-crown.

$b$ is the winding-stem.

$c$ is the toothed wheel fixed to the winding-stem and gearing with the toothed wheel $d$. This toothed wheel $d$ is journaled in a plate $e$. $f$ is a second toothed wheel journaled in this plate $e$ and gearing with the toothed wheel $d$. In the position shown in the drawing the toothed wheel $f$ gears with the toothed wheel $h$, fixed to the spindle of the watch-spring. The plate $e$ is held in this position by means of a spring $g$. In this position of the plate $e$ the winding of the watch takes place. For setting the watch-hands a push-button $i$ is provided, by means of which the plate $e$ can be moved so that the toothed wheel $f$ engages with a toothed wheel $j$. The movement of the toothed wheel $j$ is transferred by means of the toothed wheel $m$ to the minute-hand of the watch and by means of the toothed wheels $k$ and $l$ to the hour-hand of the watch, so that by pushing the button $i$ down the setting of the watch takes place.

$n$ is the regulating-hand of the watch, to which, in the well-known manner, the curbe of the balance-spring is connected. For turning the regulating-hand $n$ a second push-button $o$ is provided. This push-button $o$ acts upon a lever $s$, pivoted at $x$.

$p$ is a toothed wheel turning around the pivot $x$ of the lever $s$.

$q$ is a toothed wheel journaled in the lever $s$ and gearing with the toothed wheel $p$. The toothed wheel $p$ gears with the toothed wheel $t$, fixed to the axle $y$, to which a horseshoe-shaped plate $w$ is fixed, in the cut-out of which the point of the regulating-hand $n$ is situated.

The effect of this device is as follows: If the regulating-hand $n$ shall be moved, the push-button is pressed down, thereby swinging the lever $s$ around its pivot $x$, so that the toothed wheel $q$ engages with the toothed wheel $d$. The lever $s$ effects, furthermore, a swinging of the plate $e$ around the axle of the toothed wheel $d$ on account of this lever $s$ acting upon a pin $z$ fixed to the plate $e$. The movement imparted by means of the lever $s$ to the plate $e$ effects at the same time a disengaging of the toothed wheel $f$ from the toothed wheel $h$ and an engaging of this toothed wheel $f$ with the toothed wheel $j$. It will be understood that by pressing the push-button $o$ down a setting of the watch-hands takes place in case the winding-stem $b$ is turned. At the same time a setting of the regulating-hand $n$ takes place in consequence of the revolution of the winding-stem $b$ being transferred, by means of the toothed wheels $c, d, q, p$, and $t$, to the horseshoe-formed piece $w$, by the swinging of which the setting of the regulating-hand $n$ is effected. It will be seen, therefore, that by turning the crown $a$ after pressing the push-button $o$ down a setting of the regulating-hand $n$ is effected, and at the same time the watch-hands are moved so that by the movement of the watch-hands it can be recognized whether the movement of the regulating-hand $n$, effected by the turning of the crown, is a smaller or larger one. By this means the regulating of the watch is greatly facilitated. It will be understood that the construction may be modified in different ways, the idea of the invention consisting in providing an arrangement by means of which the movement of the regulating-hand can be recognized by the movement of the watch-hands, the coupling of the regulating-hand-setting device and of the watch-hand-setting device with the winding-stem of the watch being effected by one single operation.

Having thus fully described the nature of my invention, what I desire to secure by Letters Patent of the United States is—

In a watch, the combination comprising the watchcase, a winding-stem, a toothed wheel $c$ arranged upon this winding-stem, the toothed wheel $d$ engaging the said toothed wheel $c$, a turnable coupling-plate $e$ arranged on the shaft of said toothed wheel $d$, a toothed wheel $f$ arranged at said coupling-plate $e$, a turnable coupling-lever, a toothed wheel $q$ arranged on said coupling-lever, two toothed wheels $p$ $t$ driven by said toothed wheel $q$, a horseshoe-shaped body secured to said toothed wheel $t$ for operating the regulating-hand of the watch, a setting mechanism for setting the watch, a winding-wheel $h$, a push-button $i$ for alternate coupling the wheel $f$ with said setting mechanism respectively the winding-wheel, a second push-button for operating simultaneously by aid of said coupling-lever the regulating-hand and the setting mechanism of the watch, substantially as described.

In testimony whereof I have signed my name to this specification in the presence of two subscribing witnesses.

ADOLF FEILCKE.

Witnesses:
HENRY HASPER,
WOLDEMAR HAUPT.